Dec. 30, 1924.  1,521,402
B. R. SHOVER
CONTROL MECHANISM FOR ELECTRIC FURNACES
Filed Feb. 15, 1921   4 Sheets-Sheet 1

INVENTOR
Barton R. Shover

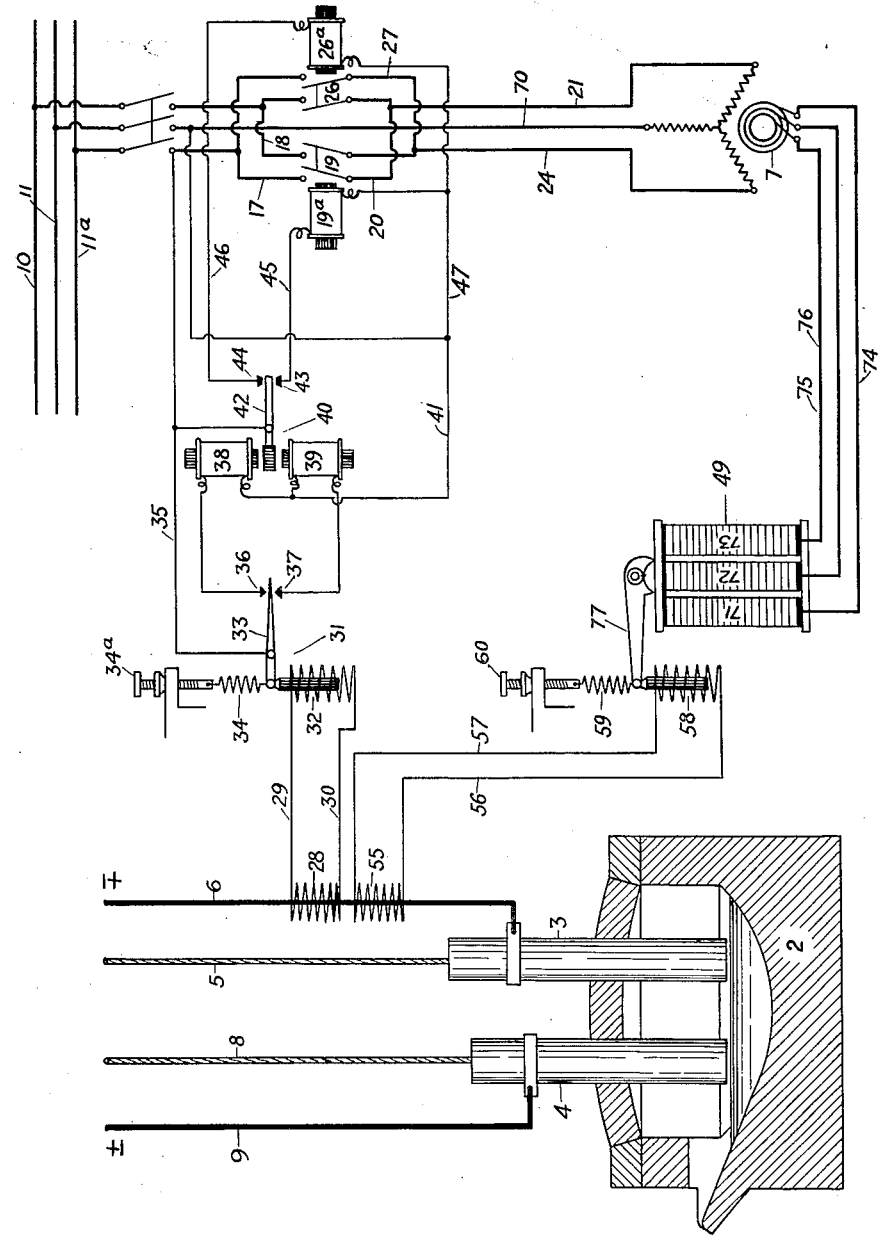

Patented Dec. 30, 1924.

1,521,402

UNITED STATES PATENT OFFICE.

BARTON R. SHOVER, OF PITTSBURGH, PENNSYLVANIA.

CONTROL MECHANISM FOR ELECTRIC FURNACES.

Application filed February 15, 1921. Serial No. 445,072.

*To all whom it may concern:*

Be it known that I, BARTON R. SHOVER, a citizen of the United States, and resident of Pittsburgh, in the county of Allegheny and State of Pennsylvania, have invented certain new and useful Improvements in Control Mechanisms for Electric Furnaces, of which the following is a full, clear, and exact description, reference being had to the accompanying drawings, forming part of this specification, in which—

Figure 4 is a diagrammatic plan like Figures 1, 2, and 3, showing a still further arrangement of apparatus adapted for use in carrying out my invention.

Figure 1:
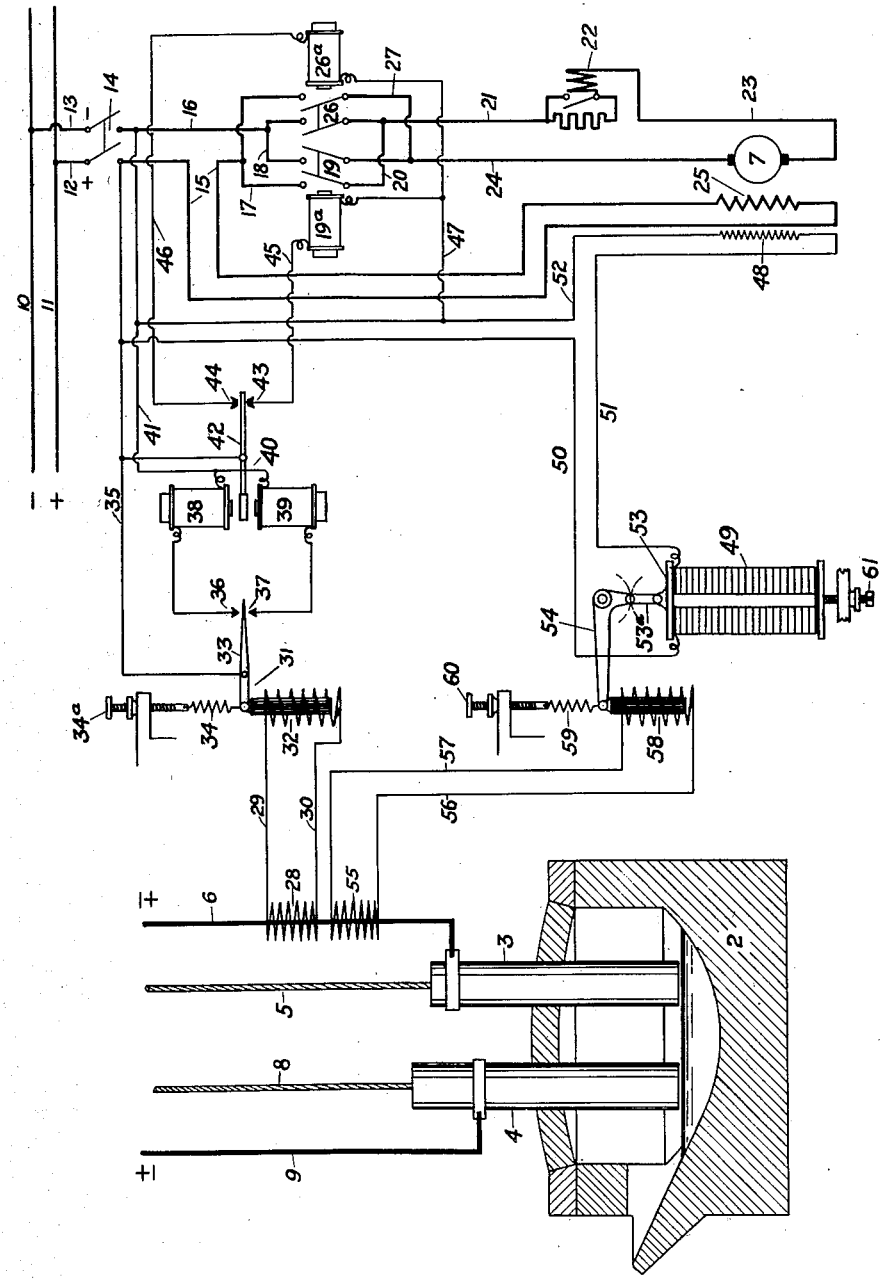
Figure 1 is a diagrammatic plan showing one arrangement of apparatus embodying my invention.

My invention relates to the operation of electric furnaces of the arc type and used in making steel and steel alloy steels and in similar melting and refining operations.

The invention more particularly relates to the control of the electrodes, and the apparatus used to regulate and control movement of the furnace electrodes in or during the operation of the furnace.

In the operation of electric furnaces of the arc type, the current value is varied from time to time, the extent and the frequency of the changes being dependent upon the requirements of the furnace. In making such changes it is important to maintain the current at the desired value, because a heavier current increases the demand upon the power supply, while a lighter current greatly prolongs the necessary time interval required to make or complete the manufacture or refining of a given quantity or "heat" of steel, or other material being produced.

In opeating such furnaces, the electrodes very frequently, if not invariably, melt holes or "wells" for themselves during the period of melting down the scrap charged into the furnace and the result is that finally pieces of the scrap fall against the electrode from the sides of the holes or wells. Such occurrence produces, what is in effect, a short circuit and results in possible blowing out of the main circuit breaker, and accompanying delays, and in any event causes undesirable peak loads on the power station, while, when purchased power is being used the maximum demand rate is often raised with the corresponding increase in the cost of the power.

In so far as I am aware, in all existing electric furnaces using automatic means for controlling the movement of the electrodes, a motor is used to raise and lower the electrodes, the motor being operatively connected to the electrodes by cables, screws or equivalent mechanical device. Ordinarily direct current motors are employed, although alternating current motors may be used. These motors are started and stopped and are reversed by means of suitable magnetic switches, the proper switch being energized by a contact making ammeter having a contact arm with two points of contact thereon, one point controlling the motor when the electrode moves upwardly, and the other when it moves downwardly. There also is a neutral position when neither of the contact points of the arm is in engagement with the energizing current. This contact arm moves in proportion to the current flowing through the electrode and the ammeter is set so that when the predetermined current is flowing the contact arm remains in its neutral position. When, for any reason, the current lessens, the contact arm will move until it is in contact with that switch which causes the motor to start in the direction which moves the electrode downwardly, and will remain in contact until such time as the current rises to the right or proper value. When this predetermined current value is again reached, the contact arm returns to, and remains in its neutral position, a position which stops the electrode operating motor. When the current becomes too high, the operation becomes reversed and the contact arm moves into position to start the motor in a direction to lift the electrode, and remains in such position until the current value is again restored, when the contact arm resumes its neutral position and the motor again stops. It has been the practice, in order to make this electrode control as sensitive as possible, to construct the ammeter as light as possible, and cause it to operate through a relay which, in turn, operates to make and break the considerably heavier current necessary to actuate the motor controlling switches.

It will be evident and is well known to those skilled in the art, that when the furnace is running smoothly, as for example, in the metal refining period, a period during which the electrodes move or reciprocate very short distances in maintaining the current at a constant value, that if the electrode operating motor is connected to the electrodes in such manner as to raise or lower the electrode with any great speed that it is apt to over-travel, and in this way will cause the whole apparatus to "hunt" or in other words cause the electrode to constantly move up and down.

It also will be clearly seen that if the movement of the electrode is made so slow as to prevent "hunting," such movement also is entirely too slow when a short circuit occurs.

The result has been that with the electrode controlling mechanisms used heretofore, a compromise is made so that hunting is not entirely prevented, and short circuiting is not stopped as quickly as is desirable.

One object of my invention is the provision of an electric furnace having novel means for regulating and controlling the movement of the electrodes occurring in the operation of such furnaces with changes in the current supply.

Another object of this invention is to provide an electrode actuating mechanism having novel means whereby, after a decrease in the current supply to the point where short circuiting with the charge in the furnace occurs, the electrode is automatically restored to normal position by a movement thereof at a gradually and progressively decreased speed by which hunting is avoided and overcome.

Another object of the invention is the provision of an electrode operating mechanism having improved means whereby the lifting movement of the elecrode is accelerated immediately after short circuiting thereof with the charge in the furnace, and whereby the electrode is then restored to its normal position at a gradually decreased speed.

A further object of the invention is to provide on an electric furnace of an electrode actuating mechanism, having novel means whereby, after the formation of a short circuit between the electrode and the metal in the furnace, the electrode is restored to its normal position at a gradually decreased speed which avoids and prevents hunting by the electrode.

Another object of the invention is the provision of improved means for actuating the electrodes of electric furnaces, whereby the electrodes are caused to rise and fall by variations in the current supply, at a progressively decreasing speed and "hunting" by the electrodes is lessened or eliminated.

Still further objects of my invention consist in the novel arrangements, constructions, and combination of parts shown by the drawings, described in detail hereinafter, and specifically pointed out in the appended claims.

Referring now to the drawings, the numeral 2 designates an electric arc furnace, and 3 and 4 are two electrodes which, as shown, are suspended from flexible connections.

The electrode 3 is connected by the flexible connection 5, through suitable reducing gearing (not shown), to the electrode operating motor 7, by means of which the electrode 3 is raised and lowered and is maintained in arcing or normally operative position. The electrode 4 is similarly suspended from a flexible connection 8 and is operated by a motor in the same way as the electrode 3.

The motor 7 is of standard construction, preferably one having a speed variation of four to one, which is a ratio that will afford sufficient speed variations for all practical purposes without excessive cost. A motor having a wider or lower speed range may be used if desired, and either a shunt or compound wound motor may be employed.

The electrode 3 is connected by a suitable flexible conductor 6 to one pole of a suitable source of electric power, and the other pole is connected by a similar conductor 9 to the second electrode 4, each electrode thereby forming an arc with the metal in the furnace, in the melting and refining operations.

In some furnaces a third electrode will be employed and with other furnaces but a single electrode will be used, one pole of the circuit being connected to the metal forming the charge in the furnace. The electrode operating and control mechanism is shown only in connection with the electrode 3. But it is to be understood that a similar operating and control mechanism will be used with the other electrodes, when more are used.

The motor 7 is adapted to be operated by power from a constant source, such as the bus bars 10, 11, which are connected through the wires 12, 13, and switch 14 to the wires 15 and 16. Branch wires 17 and 18 lead from the respective wires 15, 16, to a magnetically operated switch 19. Assuming that the wire 15 represents the plus side and the wire 16 the minus side of the circuit, the respective poles of the magnetically operated switch 19 to which these wires are connected will be accordingly energized and therefore the respective poles of the switch 19 will be referred to hereinafter as positive and negative poles.

The positive pole of the switch 19 is connected by a wire 20 to the wire 21 which is in turn connected to an accelerating switch 22, and the current passes from the switch 22 through the wire 23 to one pole of the motor armature 7. The minus side of the switch 19 is directly connected to the other pole of the motor armature 7 by a wire 24 forming a complete circuit when operating the motor to lift the electrodes within the furnace. The series winding 25 of the motor is inserted in the wire 24 at a point between the switch 14 and the branch wire 17.

A second magnetically operated switch 26 is connected to the wires 15 and 16, and has its plus side connected by a wire 27 to the wire 24, which is connected to one pole of the motor armature 7, and the minus side of this switch 26 is directly connected to the wire 21, which leads to the accelerating switch 22 and wire 23 to the other pole of the motor armature 7, in forming a complete circuit the reverse of that made through the switch 19 and operating the motor in a direction which lowers the electrodes within the furnace.

A suitable series current transformer 28 is operatively connected with the conductor 6, and connections 29 and 30 lead from the transformer 28 to a contact making ammeter 31. The contact ammeter 31 includes a solenoid 32 in circuit with the transformer 28, a contact arm 33, and a spring 34, the tension on the spring being adjusted by the screw 34ª. The ammeter contact arm 33 is connected by a wire 35 to the plus wire 15 of the motor circuit and is arranged to engage with the contacts 36 and 37 when completing the circuits to the magnetic coils 38 and 39, respectively, of the relay 40, one end of these coils being connected through the wire 41 to the minus wire 16 of the motor circuit. The relay 40 has a pivoted contact arm 42 which is connected to the wire 35 and is adapted to engage with the contacts 43 and 44, which are connected respectively by the wires 45 and 46 to one pole of the coils 19ª, 26ª of the magnetically operated switches 19 and 26. The other pole of the switch coils 19ª, 26ª is connected by the wire 47 to the wire 41 leading from the minus wire 16 of the motor circuit.

The control apparatus which has been described will operate so that any variation in the position of the electrodes will cause a change of current in the transformer 28 and will result in the contact making ammeter 31 energizing one or the other of the coils 38 or 39 of the relay 40, which in turn, will make contact with one or the other of the contacts 43, 44, so as to close one or the other of the switches 19 or 26 and thereby complete the circuit to the motor 7 for either an upward or downward movement of the electrodes as the case may be. That is to say, the motor will reciprocate the electrode vertically until its normal position is restored. It will be understood that the ammeter 31 moves in proportion to the current supplied to the electrode 3 and is set so that when the predetermined current is flowing, the contact arm 33 is in neutral position. Should the current drop off, the contact arm will move until it engages with the contact 44 connected with the magnetically operated down switch 26 and completes the circuit to the motor. When this contact is made the electrode moves downwardly until the current rises to the proper value. The contact arm 33 will then return to neutral position, thus de-energizing the magnetically operated switch 26 and breaking the circuit to the motor. Should the current become too high, the operation is automatically reversed, and the contact arm engages with the contact 43 and operates the switch 19 to complete the circuit to the motor in the reverse direction so as to cause the electrode 3 to move upwardly.

The electrode moves with considerable speed, and, unless provision is made for controlling the speed, will over-run its normal position and cause the motor to be reversed, thus causing the electrode to "hunt," that is, to keep the electrode moving up and down almost constantly. In order to prevent the electrode hunting, the motor shunt field 48 of my improved apparatus is connected in series with a carbon pile resistance 49. In making this series connection, a wire 50 leads from the plus wire of the motor circuit to the resistance 49 and a wire 51 connects the resistance 49 with one side of the shunt field 47. A wire 52 completes the circuit from the other side of the shunt field 48 to the minus wire of the motor control circuit in providing for energization of the shunt field.

The carbon pile resistance is a well known form of apparatus comprising a series of carbon plates or disks, which are loosely set one upon another, and are arranged so that when pressure is applied thereto so as to force the carbon plates together, the resistance of the pile is decreased, and when the pressure is reduced or removed, the resistance is increased.

In the carbon pile of Figure 1, a cap plate 53 is provided on top of the carbon pile, this plate being connected by a toggle link 53ª to the short arm of a bell crank 54. The bell crank is arranged so that when it is rocked in either direction, the pressure on the carbon pile is lessened or removed and its resistance correspondingly increased.

A series transformer 55 is operatively connected to the conductor 8, and connections 56 and 57 lead from the transformer 55 to the solenoid 58 which is connected to the long arm of the bell crank 54. A contractile spring 59 is connected to the long arm of the bell crank 54 to pull in the opposite direction from that of the solenoid 58, the tension on the spring being regulated by means of the adjustable screw connection 60.

The transformer 55 being permanently connected in series with the solenoid 58, the solenoid will exert a pulling force which practically is proportional to the amount of current in the electrodes. The pull of the solenoid may be varied by hand by taps giving a different number of turns in the solenoid, or by a variable resistance in the circuit, or other suitable means (not shown). The pull of the solenoid is balanced by the spring 59, the tension of the spring being varied by the adjusting screw 60, so that the long arm of the bell crank 54 can be maintained in a horizontal position for various or different current values in the electrode 3, which values will be referred to herein as "normal".

It is evident that due to the bell crank and toggle connections operating against the cap plate 53 of the carbon pile 49, that for any predetermined normal current in the electrodes 3 and 4, if the spring 59 is properly adjusted, the long arm of the bell crank 54 will be in horizontal position and the greatest possible amount of pressure will be exerted on the carbon pile 49. It also will be evident that when the bell crank is in this position the carbon pile will have its least resistance. The screw 61 on the bottom or base of the carbon pile 49 provides adjusting means so that the carbon pile may be moved vertically so as to vary the amount of resistance the pile may exert.

With the long arm of the bell crank 54 extending horizontally and the least amount of resistance in the pile 49, the shunt field 48 of the motor is strongest and consequently the motor speed is at a minimum. This entire mechanism is set so as to work slightly slower than the contact making ammeter 31, controlling the circuit to the motor armature 7, and therefore a slight change in the amount of current in the electrode 3 will cause the motor 7 to run at a very slow speed, thus moving the electrode slowly, and consequently allowing it to come to rest upon reaching the normal position, without overrunning or "hunting".

With any great or sudden change in the value of the current in the electrode 3, the series transformer will cause the solenoid to act, and by moving the bell crank 54 will lessen the pressure on the carbon pile 49, and increase the resistance of the pile. As the resistance increases, the current in the shunt field 48 of the motor is decreased, and the motor speed accordingly increased. Thus in case of no current, or in case of a short circuit, the motor 7 will run at its maximum speed until the electrodes approach their normal position. As the electrode approaches normal position the current in the electrode again approaches to normal value, and the series transformer 55 will cause the solenoid 58 to act and again apply pressure to the carbon pile 49 and lessen its resistance. As the resistance is decreased in the carbon pile, the shunt field 48 will be more highly energized, and the motor 7 accordingly decreases in speed as the electrode approaches normal position and the current value therein becomes normal.

In other words, the carbon pile resistance 49 will slow down the speed of the motor as the electrode approaches normal position while moving in either vertical direction.

Figure 2:
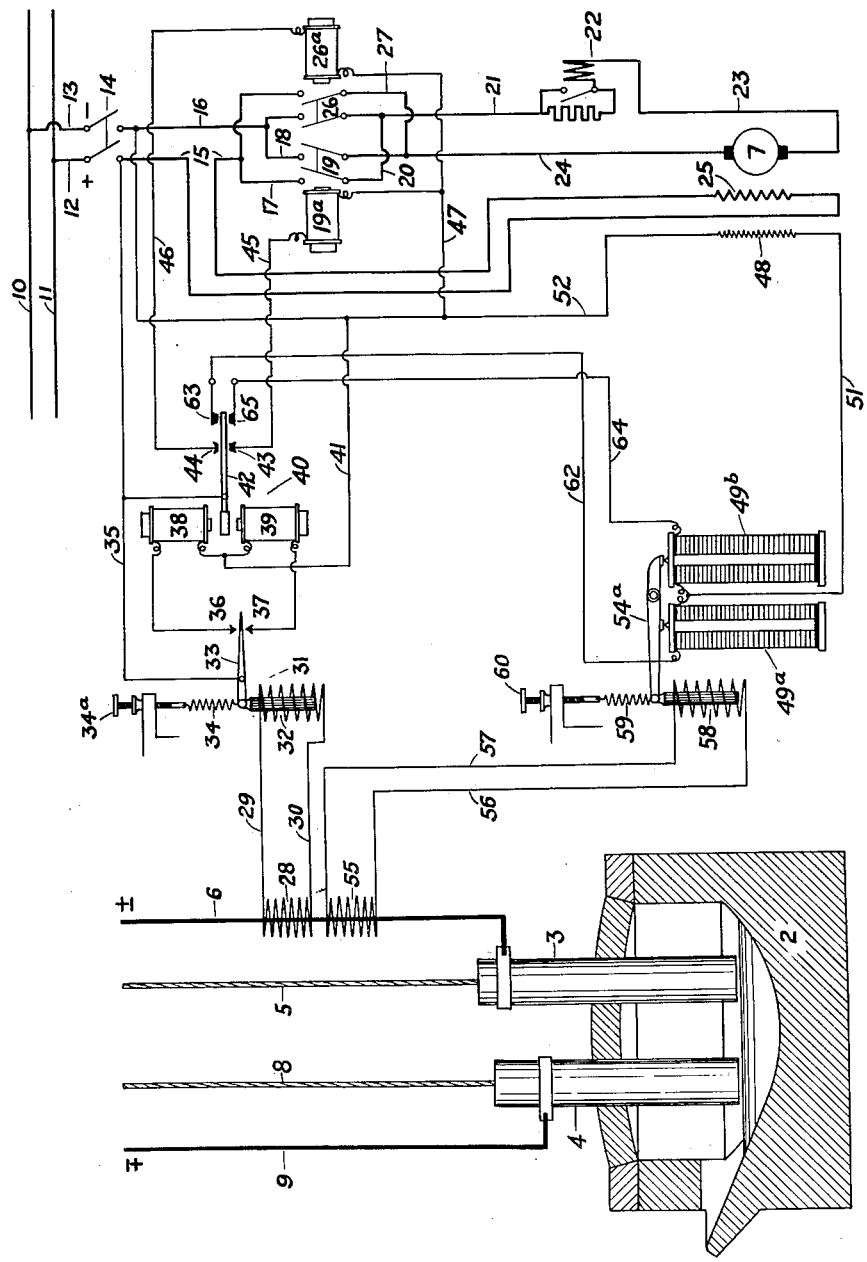
Figure 2 is a similar diagrammatic plan showing a modified form of apparatus constructed and arranged in accordance with this invention.

In Figure 2, two carbon piles 49$^a$ and 49$^b$ are used (instead of one, as in Figure 1), the carbon pile 49 controlling the shunt field 48 when the motor is operating to move the electrode downwardly, and the carbon pile 49$^b$ controlling the shunt field 48 when the motor is operating to move the electrode upwardly. The carbon piles 49$^a$ and 49$^b$ are energized only when the circuit is completed to the motor 7, since one pole of the pile 49$^a$ is connected by the wire 62 to the contact 63, and one pole of the pile 49$^b$ is connected by the wire 64 to the contact 65, the other pole of each of the piles 49$^a$ and 49$^b$ being connected to the side of the shunt field 48 and the other side of the shunt field being connected by the wire 51 to the minus wire of the motor operating circuit, as in Figure 1. The contacts 63 and 65 are adapted to make circuit with an extension of the contact arm 42 of the relay 40, which is connected to the plus side of the motor operating circuit.

In Figure 2 a spring balanced rocking lever 54$^a$ has been substituted for the bell crank 54 of Figure 1 and operates substantially in the same manner to apply or relieve pressure on the carbon piles 49$^a$ and 49$^b$.

Figure 3:
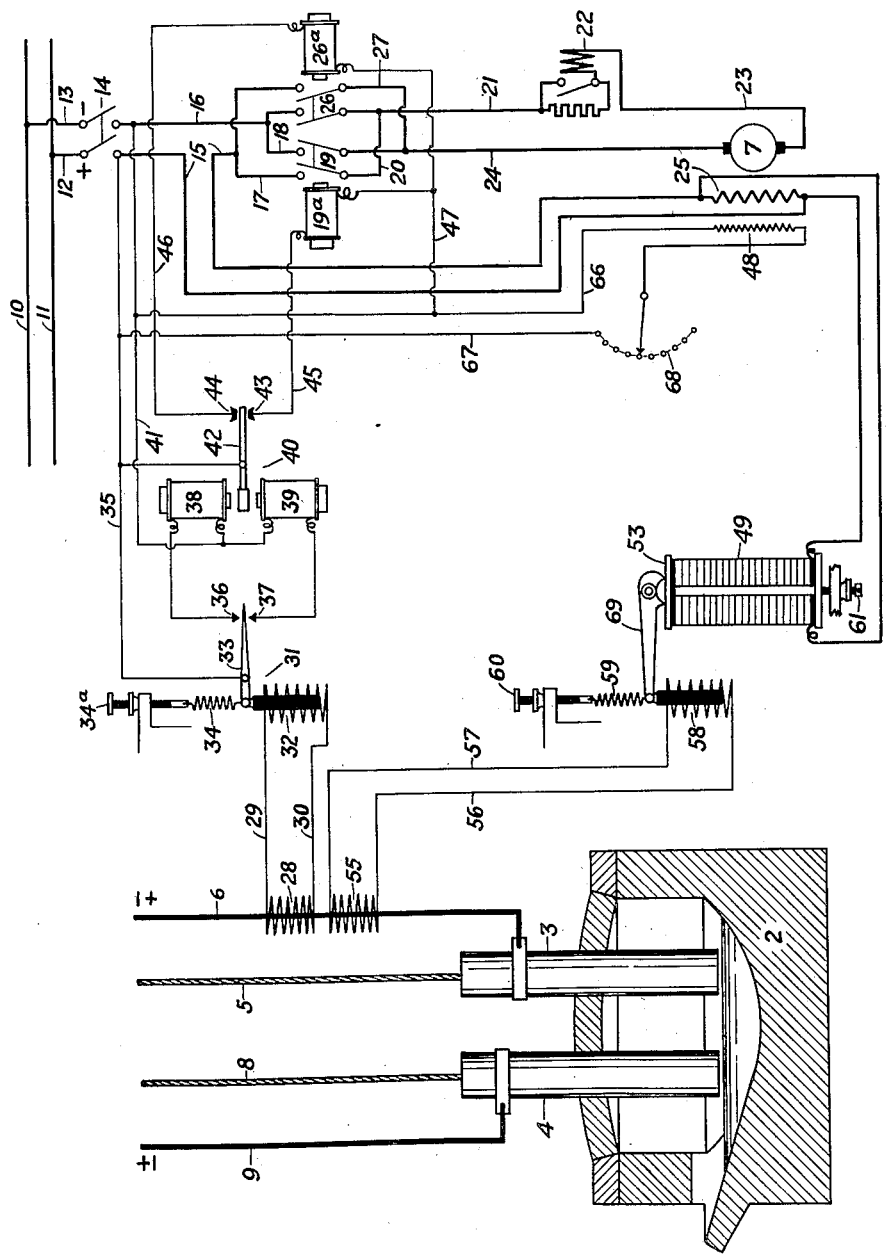
Figure 3 is a diagrammatic plan similar to Figures 1 and 2, showing another arrangement of apparatus embodying my invention.

In Figure 3 the use of a carbon pile 49 is shown having its poles connected to each side of the series field winding 25 of a compound wound motor, or a series motor, this arrangement causing a variable resistance shunt around the series field, and thus producing the same effect at the apparatus of Figures 1 and 2. The shunt field of the motor is connected by wires 66 and 67 to the plus and negative wires of the motor operating circuit, and a field rheostat 68, which is connected in the circuit to the shunt field winding, provides for hand control for varying the strength of this shunt field. In the construction of Figure 3, a cam lever 69 is substituted for the bell crank and toggle construction of Figure 1, for operating the carbon pile 49. However, the action is the same as in Figure 1, and movement of the bell crank in either direction from the central position decreases the resistance of the carbon pile. The arrangement of Figure 3 also may be applied to a series motor, when found desirable or necessary.

In Figure 4 the motor 7 is shown as an alternating current, slip-ring motor, using a three-wire system for the motor control circuit, the third wire being designated by the numeral 70.

The resistance 49 of Figure 4 is composed of three separate piles of carbon disks 71, 72, and 73, and the piles are connected by separate wires 74, 75, and 76, respectively, to the rotor of the motor, and these vary the current of such rotor as the carbon piles are compressed or loosened by the action of the cam lever 77, which is similar to the cam lever 69 of Figure 3, and is operated by the series current transformer 55, and solenoid 58, in the same manner as in the construction of Figure 1.

A similar arrangement may be used with a direct current series or compound wound motor by connecting a carbon pile in series with the armature.

The operation of the different forms of my improved apparatus is substantially the same and will be readily understood by those skilled in the art. It will be readily seen that I have provided means for slowing up the motor 7 when it is rotating in either direction, in raising or lowering the electrode, at or about the time the electrode reaches the ideal or normal position, that is, the position where the current flowing therethrough is normal and a satisfactory arc is being formed, whereby the electrode is prevented from hunting, the efficiency of the electric arc furnace is materially increased, and high peak loads on the power line are avoided and prevented.

While several specific forms of apparatus constructed to carry out my invention have been shown and described, it will be understood that I do not wish to be limited thereto, since they are only illustrative and various changes in the design, construction, and combination of the parts may be made without departing from the spirit of my invention as defined in the appended claims. The electrodes may be arranged to move downward slowly or at a uniform speed, as for example by means of a screw mechanism. Commutating shunt fields may be operated by apparatus similar to the carbon pile.

Instead of having the carbon pile resistance in series with the shunt field, the fields may be divided into sections connected to a commutating device which in turn is operated by the series transformer 55 in varying the strength of the shunt field in obtaining the desired results.

The apparatus of Figures 1 and 2 may be combined so that the speed of the motor is changed by both the action of the resistance in the shunt field and by varying the resistance in the shunt surrounding the series field, and other changes may be made within the scope of the claims.

I claim:—

1. In an electric furnace, a reciprocally movable electrode, an electrode actuating motor, means operatively connecting said motor and electrode, and means for automatically controlling the operation of said motor, said controlling means being adapted to cause the motor to move the electrode into neutral position with a gradually decreased speed, said speed being proportional to the variation of the current flowing through the electrode in the reciprocal movement thereof.

2. In an electric furnace, a movable electrode, an electrode actuating motor, means operatively connecting said motor and electrode, and means actuated by the current flowing through said electrode for automatically making and breaking the circuit to start and stop said motor to maintain said electrode in operative position, and other means actuated by the current flowing through said electrode adapted to decrease the speed of said motor in direct proportion to the variation of the current flowing through said electrode as said electrode approaches its neutral position.

3. In an electric furnace, a reciprocally movable electrode, an electrode actuating motor, means operatively connecting said motor and electrode, and means actuated by the current flowing through said electrode for automatically maintaining said electrode in operative position, said means being adapted to move said electrode into neutral position with a gradually decreased speed, said speed being directly proportional to the variation of the current flowing through the electrode in the reciprocal movement thereof.

4. In an electric furnace, a movable electrode, an electrode actuating motor, means operatively connecting said motor and electrode, means automatically actuated by the current flowing through said electrode for making and breaking the operating circuit for said motor to start and stop said motor, and means for varying the excitation of some of the windings of said motor proportional to the variations of current flowing through said electrode, to thereby vary the speed of said motor and prevent hunting of said electrode.

5. In an electric furnace, a movable electrode, an electrode actuating motor, means operatively connecting said motor and electrode, means automatically actuated by the current flowing through said electrode for making and breaking the operating circuit for said motor, to start and stop said motor, a resistance member for varying the excitation of some of the windings of said motor to thereby vary its speed, and means actuated by the current flowing through said electrode adapted to vary the power of said resistance member, so as to cause said motor to move with a gradually decreasing speed, as said electrode approaches its neutral position.

6. In an electric furnace, a movable electrode, an electrode actuating motor, means operatively connecting said motor and electrode, means automatically actuated by the current flowing through said electrode for making and breaking the operating circuit for said motor to start and stop said motor, and a carbon pile resistance connected with some of the windings of said motor, and adapted to vary the excitation thereof, to thereby vary the motor speed.

7. In an electric furnace, a movable electrode, an electrode actuating motor, means operatively connecting said motor and electrode, means automatically actuated by the current flowing through said electrode for making and breaking the operating circuit for said motor to start and stop said motor, and a carbon pile resistance connected in series with some of the windings of said motor, and adapted to vary the excitation thereof, to thereby vary the motor speed.

8. In an electric furnace, a movable electrode, an electrode actuating motor, means operatively connecting said motor and electrode, means automatically actuated by the current flowing through said electrode for making and breaking the operating circuit for said motor to start and stop said motor, a carbon pile resistance in series with some of the windings of said motor and adapted to vary the excitation thereof to thereby vary the speed of said motor, a series transformer connected with said electrode, and means actuated by the current from said transformer for varying the resistance power of said carbon pile resistance so as to cause said motor to move with a gradually decreasing speed, as said electrode approaches its neutral position.

9. In an electric furnace, a movable electrode, an electrode actuating motor, means operatively connecting said motor and electrode, means adapted to be automatically actuated by the current flowing through said electrode for making and breaking the operating circuit to said motor, to start and stop said motor, a resistance member connected with some of the windings of said motor and adapted to vary the excitation thereof to thereby vary the speed of said motor, a series transformer connected with said electrode, and means actuated by the current from said transformer for varying the resistance power of said resistance member, so as to cause said motor to move with a gradually decreasing speed as said electrode approaches its neutral position.

10. In an electric furnace, a movable electrode, an electrode actuating motor, means operatively connecting said motor and electrode, a series transformer connected to said electrode, means actuated by the current from said transformer for making and breaking the operating circuit to said motor to start and stop said motor, a carbon pile resistance connected with some of the windings of said motor and adapted to vary the excitation thereof to thereby vary the speed of said motor, a series transformer connected with said electrode, and means actuated by the current from said transformer for varying the resistance power of said carbon pile resistance, so as to cause said motor to move with a gradually decreasing speed, as said electrode approaches its neutral position.

11. The method of operating arc furnaces to maintain a constant current on the arc which is operating on a constant potential system, which consists in mechanically raising and lowering the electrodes in establishing and maintaining the arc normal and automatically controlling the raising and lowering of said electrodes so as to cause a quick acceleration at the beginning of either the up or down movement of the electrode and a gradual deceleration as the arc approaches normal, to thereby maintain a relatively constant current on the arc and prevent hunting of the electrode.

12. In the method of operating arc furnaces employing motor operated electrodes, the step consisting of automatically varying the speed of the operating motor proportional to the variations in the current passing through the electrodes to thereby cause said electrodes to approach their neutral position with a gradually decreasing speed.

13. The method of electric arc furnace regulation, which consists in causing the electrode to reciprocate vertically to maintain a normal arc, and controlling the speed of reciprocation so that it will vary proportionally with the variations of current flowing through the electrode and thus approach its normal arc position with a gradual decreasing speed.

In testimony whereof I have hereunto signed my name.

BARTON R. SHOVER.